(12) United States Patent
Yano et al.

(10) Patent No.: US 6,781,304 B2
(45) Date of Patent: Aug. 24, 2004

(54) EL PANEL

(75) Inventors: Yoshihiko Yano, Tokyo (JP); Jun Hirabayashi, Tokyo (JP); Katsuto Nagano, Tokyo (JP); Mutsuko Nakano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/347,441

(22) Filed: Jan. 21, 2003

(65) Prior Publication Data

US 2003/0184216 A1 Oct. 2, 2003

(30) Foreign Application Priority Data

Jan. 21, 2002 (JP) .......................... 2002-011732
Jan. 21, 2002 (JP) .......................... 2002-011733

(51) Int. Cl.$^7$ .............................. H05B 33/00
(52) U.S. Cl. .................. 313/503; 313/501; 313/506; 428/917
(58) Field of Search ................. 313/501–503, 313/506, 112; 428/917; 315/169.3

(56) References Cited

U.S. PATENT DOCUMENTS

| | | |
|---|---|---|
| 5,753,934 A | 5/1998 | Yano et al. |
| 5,801,105 A | 9/1998 | Yano et al. |
| 5,810,923 A | 9/1998 | Yano et al. |
| 5,828,080 A | 10/1998 | Yano et al. |
| 5,919,515 A | 7/1999 | Yano et al. |
| 5,955,213 A | 9/1999 | Yano et al. |
| 5,985,404 A | 11/1999 | Yano et al. |
| 6,045,626 A | 4/2000 | Yano et al. |
| 6,074,575 A * | 6/2000 | Sugioka et al. ....... 252/301.4 S |
| 6,096,434 A | 8/2000 | Yano et al. |
| 6,121,647 A | 9/2000 | Yano et al. |
| 6,198,208 B1 | 3/2001 | Yano et al. |
| 6,258,459 B1 | 7/2001 | Noguchi et al. |
| 6,387,712 B1 | 5/2002 | Yano et al. |
| 6,441,551 B1 * | 8/2002 | Abe et al. .................... 313/503 |
| 6,597,108 B2 * | 7/2003 | Yano et al. ................ 313/503 |
| 6,614,173 B2 * | 9/2003 | Yano et al. ................ 313/503 |

FOREIGN PATENT DOCUMENTS

| | | |
|---|---|---|
| JP | 7-122364 | 5/1995 |
| JP | 8-134440 | 5/1996 |

OTHER PUBLICATIONS

Mitsuhiro Kawanishi, et al., "CaAl$_2$S$_4$: Ce Thin Film EL Devices Prepared by the Two Targets Pulse Electron–Beam Evaporation", Technical Report of IEICE, EID 98–113, 1999–2001, pp. 19–24.

Noboru Miura, et al., "High–Luminance Blue–Emitting BaAl$_2$S$_4$:Eu Thin–Film Electronluminescent Devices", Jpn. J. Appl. Phys., vol. 38, Part 2, No. 11B, Nov. 15, 1999, pp. L1291–L1292.

Shozo Oshio and Tomizo Matsuoka, "Novel Electroluminescent Thin Films:Thiogallate–Type Phosphors", Display and Imaging 1994, vol. 3, pp. 181–185.

M. Matsura, et al., "Performance of RGB Multi–Color Organic EL Display", Asia Display '95, Oct. 16–18, 1995, The Institute of Television Engineers of Japan, The Society for Information Display.

* cited by examiner

Primary Examiner—Ashok Patel
(74) Attorney, Agent, or Firm—Oblon, Spivak, McClelland, Maier & Neustadt, P.C.

(57) ABSTRACT

An EL panel for providing a display of three colors, comprising at least EL phosphor thin films of two types for emitting green and blue colors, and a red light emitting portion, the EL phosphor thin films of two types for emitting green and blue colors comprising an alkaline earth sulfide or oxide. The EL panel, especially full color EL panel can produce light of an improved color purity without a need for a RGB patterned filter.

12 Claims, 3 Drawing Sheets

EL PANEL

TECHNICAL FIELD

This invention relates to an inorganic EL panel, and more particularly, to a full color EL panel comprising light emitting layers for producing three colors RGB.

BACKGROUND OF THE INVENTION

In the recent years, active research works have been made on thin-film EL devices as small or large-size, lightweight flat panel displays. A monochromatic thin-film EL display using a phosphor thin film of manganese-doped zinc sulfide capable of emitting yellowish orange light has already become commercially practical as a dual insulated structure using thin-film insulating layers 2 and 4 as shown in FIG. 3. In FIG. 3, a predetermined pattern of lower electrodes 5 is formed on a substrate 1, and a first insulating layer 2 is formed on the lower electrode-bearing substrate 1. On the first, insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5.

Thin-film EL displays must display images in color in order that they find use as computer, TV and similar monitors. Thin-film EL displays using sulfide phosphor thin films are fully reliable and resistant to the environment, but at present regarded unsuitable as color displays because EL phosphors required to emit light in the primary colors of red, green and blue have poor characteristics. Engineers continued research on SrS:Ce (using SrS as a matrix material and Ce as a luminescence center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primary colors of red, green and blue suffer from problems of emission luminance, emission efficiency and color purity. Thus color EL panels have not reached the commercial stage. With respect to blue, in particular, a relatively high luminance is achieved using SrS:Ce. However, its luminance is yet short as the blue color for full color display, and its chromaticity is shifted toward the green side. There is a need to have a better blue light emitting layer.

To solve the above and other problems, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Shingaku Giho (Communications Society Technical Report), EID 98-113, pp. 19–24, and Jpn. J. Appl. Phys., Vol. 38 (1999), pp. L1291–1292. These thiogallate base phosphors are satisfactory in color purity, but suffer from a low luminance and especially, difficulty to form a thin film of uniform composition because of the multi-component composition. It is believed that thin films of quality are not obtainable because of poor crystallinity resulting from inconvenient composition control, formation of defects resulting from sulfur removal, and admittance of impurities; and these factors lead to a failure to increase the luminance. In particular, thioaluminate base phosphors are quite difficult to control their composition.

All the EL spectra of the aforementioned blue, green and red EL phosphor thin films are broad. When they are used in a full-color EL panel, RGB necessary as the panel must be cut out of the EL spectra of the EL phosphor thin films using filters. Use of filters complicates the manufacture process and, still worse, brings about a lowering of luminance. When RGB are taken out through filters, the luminance of blue, green and red EL phosphor thin films is lost by 10 to 50% so that the luminance is reduced below the practically acceptable level.

RGB filters for full color display are generally RGB filters which are formed in their own pixel pattern on a glass substrate, separately from the substrate having formed thereon phosphor films for RGB. The glass substrate is set in alignment with the phosphor substrate to construct a full color panel. However, this method requires two micropatterned substrates and the manufacturing process is complex and expensive and thus impractical.

To solve the above-discussed problems, there is a desire to have a panel capable of red, green and blue light emissions of good color purity and a high luminance without a need for an RGB filter in the formed of a patterned glass substrate.

Most of prior art EL phosphor thin films are deposited at relatively high temperatures. When these phosphor films are patterned by photo-lithography so as to provide the three primary colors, the process encounters extraordinary difficulty and is not practical. In particular, those phosphor thin films capable of emitting light of a high luminance and a high color purity are deposited at higher temperatures. It is extremely difficult with currently available material systems to pattern such phosphor thin films all by photo-lithography to construct a full color display of a high luminance and high definition.

SUMMARY OF THE INVENTION

An object of the invention is to provide an EL panel, especially a full color EL panel, comprising phosphor thin films for producing light of an improved color purity without a need for a RGB patterned filter substrate.

The present invention provides an EL panel for providing a display of three colors, comprising at least EL phosphor thin films of two types for emitting green and blue colors, and a red light emitting portion, wherein the EL phosphor thin films of two types for emitting green and blue colors comprise an alkaline earth sulfide or oxide.

In a preferred embodiment, only the red light emitting portion has a color conversion layer. More preferably, the red light emitting portion includes a phosphor thin film for emitting electroluminescent light from an output surface and the color conversion layer disposed on the output surface.

In another preferred embodiment, the red light emitting portion is constructed by combining the EL phosphor thin film for emitting green or blue color with a color conversion layer.

In a preferred embodiment, the red light emitting portion includes an EL phosphor thin film composed primarily of ZnS:Mn.

In a preferred embodiment, the EL phosphor thin film for emitting green color comprises as a matrix material an alkaline earth thiogallate which may contain oxygen, and the EL phosphor thin film for emitting blue color comprises as a matrix material an alkaline earth thioaluminate which may contain oxygen. More preferably, the EL phosphor thin film for emitting blue color comprises as a matrix material barium thioaluminate. Further preferably, the EL phosphor thin film for emitting green color comprises as a matrix material strontium thiogallate. Most often, both the phosphor thin films contain Eu as a luminescence center.

In a preferred embodiment, when expressed in the CIE color purity coordinates (x, y), the green color emitted has coordinates of x<0.3 and y>0.6 and the blue color emitted has coordinates of x<0.2 and y<0.2.

In a further preferred embodiment, the EL phosphor thin films of two types are represented by the compositional formula:

$$A_xB_yO_zS_w:R$$

wherein A is at least one element selected from the group consisting of Mg, Ca, Sr, Ba and rare earth elements; B is at least one element selected from the group consisting of Al, Ga and In; x is a number from 0 to 5, y is a number from 0 to 15, z is a number from 0 to 30, w is a number from 0 to 30; and R is an element serving as a luminescence center.

In a still further preferred embodiment, each of the EL phosphor thin films of two types for emitting green and blue colors comprises an oxysulfide which contains oxygen and sulfur elements such that the molar ratio of O/(S+O) is in the range from 0.01 to 0.85.

DETAILED DESCRIPTION OF THE INVENTION

The EL panel of the present invention is a color panel capable of developing the three colors RGB using at least EL phosphor thin films of two types for emitting green and blue colors.

The EL phosphor thin films of two types for emitting green and blue colors each are made of a matrix material comprising an alkaline earth sulfide or oxide which may contain oxygen, preferably an alkaline earth sulfide, alkaline earth oxide, alkaline earth thioaluminate, alkaline earth aluminate, alkaline earth thiogallate, alkaline earth gallate, alkaline earth indate or alkaline earth thioindate, with at least europium (Eu) added as a luminescence center.

These green and blue primary color-emitting phosphor thin films are phosphor thin films capable of emitting green and blue light of improved color purity and high luminance without a need for a filter as will be described later. This enables three primary color display of RGB simply by using a color conversion layer such as a filter only in the red light emitting portion.

For the light emissions of green and blue primary colors as used herein, the green primary color has coordinates of x<0.3 and y>0.6 and the blue primary color has coordinates of x<0.2 and y<0.2, when expressed in the CIE color purity coordinates (x, y).

For the red light emitting portion, use is preferably made of the blue primary color phosphor or green primary color phosphor, especially the green primary color phosphor. The blue or green primary color phosphor has a high quantum efficiency at a short wavelength. To derive red color from the blue or green primary color phosphor, a color conversion thin-film layer is disposed on the phosphor output side for conducting color conversion. The color conversion thin-film layer is provided only in those regions where red color is necessary, whereas the colors of light emission of phosphors in the remaining regions are directly used as the green and blue primary colors.

As used herein, the color conversion thin-film layer is a medium film having an organic fluorescent dye dispersed herein having a function to absorb blue or green light for converting to fluorescent radiation of a longer wavelength. The color conversion thin-film layer may be constructed of well-known materials, like a fluorescent conversion layer having a red fluorescent dye dispersed in a resin, which uses blue light from a blue light emitting device as an excitation light source, as described in, for example, Proc. 15th Int. Display Research Conference, page 269, 1995.

Like conventional LCD, the color conversion thin-film layer may also be obtained by patterning a red-conversion thin-film layer on a glass substrate in accordance with the corresponding pixels and setting the glass substrate in alignment with the phosphor substrate. In contrast with the conventional LCD which requires patterning for each of R, G and B, the present invention requires patterning of only a color conversion thin film for red (R).

Figure 1:
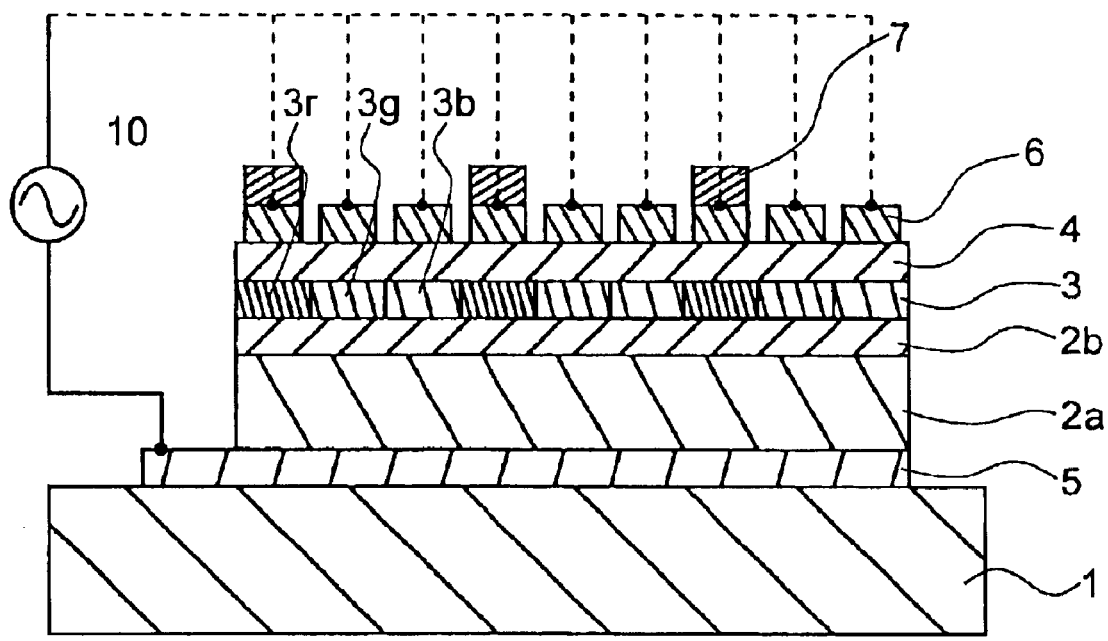
FIG. 1 is a schematic cross-sectional view showing the basic construction of an EL panel according to the invention.

However, in order to take best advantage of the invention, it is preferred to form a color conversion film directly on the output surface of a blue or green EL phosphor thin film through which light comes out during EL emission, that is, on the phosphor substrate rather than to place the glass substrate in alignment with the phosphor substrate. FIG. 1 illustrates the most preferred construction. In the illustrated embodiment, a phosphor thin film or light emitting layer 3 includes phosphor regions 3r, 3g and 3b assigned to red, green and blue colors, respectively. Disposed above the phosphor regions 3r assigned to red color (that is, blue or green EL phosphor thin film) are an upper electrode 6 and a color conversion thin-film layer 7.

The color conversion thin-film layer is preferably one containing a fluorescent dye capable of absorbing the light emitted by the above-mentioned EL phosphor and changing its wavelength. In this case, the conversion from green to red is often accompanied by a higher conversion efficiency.

The fluorescent dye used herein is not critical as long as it has a strong fluorescent ability in the solid state (inclusive of a dispersed-in-resin state) although a commercially available laser dye is preferred.

It is also acceptable to include two or more of fluorescent pigments and/or fluorescent dyes.

Examples of suitable fluorescent pigments include azo, phthalocyanine, anthraquinone, quinacridone, isoindolinone, thioindigo, perylene, and dioxazine families, with the azo and isoindolinone families being preferred as well as Lumogen Color from BASF AG.

Suitable fluorescent dyes are laser dyes and the like, and examples include xanthene dyes such as Rhodamine B and Rhodamine 6G, cyanine dyes such as 4-dicyanomethylene-2-methyl-6-(p-dimethylaminostyryl)-4H pyran (DCM), pyridine dyes such as 1-ethyl-2-(4-(p-dimethylaminophenyl)-1,3-butadienyl)pyridinium perchlorate (Pyridine 1), oxazine dyes, chrysene dyes, thioflavine dyes, perylene dyes, pyrene dyes, anthracene dyes, acridone dyes, acridine dyes, fluorene dyes, terphenyl dyes, ethene dyes, butadiene dyes, hexatriene dyes, oxazole dyes, coumarin dyes, stilbene dyes, di- and triphenylmethane dyes, thiazole dyes, thiazine dyes, naphthalimide dyes, and anthraquinone dyes. Of these, xanthene dyes such as Rhodamine B and Rhodamine 6G, coumarin dyes and naphthalimide dyes are preferred.

Preferred examples of the organic fluorescent dyes capable of absorbing light in the blue or green region and generating fluorescent radiation in the red region include Rhodamine dyes such as Rhodamine B, Rhodamine 6G, Rhodamine 3B, Rhodamine 101, Rhodamine 110, Sulforhodamine, Basic Violet 11, and Basic Red 2; pyridine dyes such as 1-ethyl2-(4-(p-dimethylaminophenyl)-1,3-butadienyl)pyridinium perchlorate (Pyridine 1), cyanine dyes and oxazine dyes.

The color conversion thin-film layer may take any desired form, for example, a film formed of a fluorescent dye as exemplified above by evaporation or sputtering, or a film having a fluorescent dye dispersed in a suitable resin as a medium. The thickness of the film is not critical as long as it does not impede the function of absorbing the light from the EL phosphor and generating fluorescent radiation. The film thickness is usually about 10 nm to about 100 μm although it differs with the type of fluorescent dye.

In the case of a film having a fluorescent dye dispersed in a suitable resin as a binder, the concentration of the fluorescent dye dispersed may be in the range where concentration quenching of fluorescence does not occur and exciting radiation is fully absorbed.

In the case of a film dispersed in a resin, steps formed between R pixels and G or B pixels may be covered with a resin or the like for flattening, improving visibility.

Also, any energy loss associated with color conversion and any drop of luminance resulting from light absorption by the resin in which the fluorescent dye is dispersed can be adjusted by regulating the emissive area.

It is also possible to adjust the color purity of red color by combining the cover conversion thin-film layer with a filter layer. Any well-known filter material may be used in the filter layer.

Alternatively, a phosphor material for red color may be used instead of the combination of the green or blue phosphor layer with the cover conversion film. The preferred phosphor material for red color is ZnS:Mn phosphor material. The ZnS:Mn phosphor has an emission efficiency of about 10 lm/W which is the highest among EL phosphors and provides the highest luminance. However, the color of emission is orange, which requires a color conversion thin-film layer to be provided on the emissive side of the phosphor for conducting color conversion to produce a red color. The color conversion thin-film layer is provided only for the ZnS:Mn phosphor whereas the colors of emission of phosphors in the remaining regions are directly used as the green and blue primary colors.

The color conversion thin-film layer may be a layer having a function of taking out a red color component from orange light by utilizing its light transmissive characteristics, for example, an optical filter film for red color as used in LCD, a red color inorganic film of ZnSe or the like, or a multilayer film as used in optical interference filters. Also preferred is a layer in the form of a medium film in which an organic fluorescent dye is dispersed and which has a function of absorbing orange light and converting it into fluorescent radiation of a longer wavelength.

The color conversion thin-film layer may also be provided, like prior art LCD filters, by patterning a red filter on a glass substrate in accordance with the corresponding pixels, and placing the glass substrate in alignment with the phosphor substrate. As opposed to the prior art requiring patterning of every RGB, the present invention requires patterning of only red color (R).

However, in order to take best advantage of the invention, it is preferred to form a color conversion film directly on the output surface of a ZnS:Mn based EL phosphor thin film through which light comes out during EL emission, that is, on the phosphor substrate rather than to place the glass substrate in alignment with the phosphor substrate. As described above, the most preferred construction shown in FIG. 1 includes the phosphor regions $3r$, $3g$ and $3b$ assigned to red, green and blue colors, respectively, and the color conversion thin-film layer 7 which is disposed above the upper electrode 6 which is disposed above the phosphor regions $3r$ assigned to red color.

The color conversion thin-film layer is preferably one containing a fluorescent dye capable of absorbing the light emitted by the above-mentioned EL phosphor and changing its wavelength. Its construction may be the same as used in the green and blue phosphor layers.

The fluorescent pigment or dye may be any appropriate one selected from the above-listed examples, and the method of forming the color conversion thin-film layer is also the same.

The alkaline earth thioaluminates, alkaline earth aluminate, alkaline earth thiogallates, alkaline earth gallates, alkaline earth indates, and alkaline earth thioindates used in the green and blue primary color EL phosphor thin films are represented by $A_5B_2C_8$, $A_4B_2C_7$, $A_2B_2C_5$, $AB_2C_4$, $AB_4C_7$, $A_4B_{14}C_{25}$, $AB_8C_{13}$ or $AB_{12}C_9$ wherein A stands for an alkaline earth metal, B stands for aluminum, gallium or indium, and C stands for sulfur or oxygen. For the matrix material, these compounds may be used alone or in admixture of two or more, and they may be in an amorphous state having no definite crystal structure.

As used herein, the alkaline earth metals include Be, Mg, Ca, Sr, Ba and Ra. Of these, Mg, Ca, Sr and Ba are preferred, with Ba and Sr being most preferred.

The elements to be combined with the alkaline earth metals include Al, Ga and In. These elements may be selected in an arbitrary combination.

The EL phosphor thin film preferably contains sulfur and oxygen and are represented by the compositional formula:

$$A_xB_yO_zS_w:R$$

wherein A is at least one element selected from among Mg, Ca, Sr, Ba and rare earth elements; B is at least one element selected from among Al, Ga and In; and R is an element serving as a luminescence center, and in a preferred embodiment, essentially contains europium.

The subscripts x, y, z and w denote molar ratios of elements A, B, O and S, respectively. Preferably, x is from 0 to 5, y is from 0 to 15, z is from 0 to 30, w is from 0 to 30, and more preferably, x is from 1 to 5, y is from 1 to 15, z is from 3 to 30, and w is from 3 to 30.

When oxygen is contained in the alkaline earth sulfide matrix material, the oxygen is preferably added in such amounts that the atomic ratio of oxygen to sulfur in the matrix material, represented by O/(S+O), may be from 0.01 to 0.85, and more preferably from 0.05 to 0.5. When converted to the compositional formula shown above, the value of z/(z+w) is preferably from 0.01 to 0.85, more preferably from 0.05 to 0.5, even more preferably from 0.1 to 0.4, and most preferably from 0.2 to 0.3.

The composition of the phosphor thin film can be determined by x-ray fluorescence analysis (XRF), x-ray photo-electron spectroscopy (XPS) or the like.

Oxygen has an effect of dramatically enhancing the luminance of EL emission of a phosphor thin film. A light emitting device has a lifetime in the sense that luminance degrades with the passage of emitting time. The addition of oxygen can improve lifetime characteristics and prevent luminance degradation. It is believed that the addition of oxygen to a sulfide matrix material facilitates crystallization during film deposition of the matrix material or during annealing or other post-treatment after film deposition, so that the rare earth element added takes an effective transition state within the compound crystal field to ensure stable light emission at a high luminance. In addition, the matrix material itself becomes stable in air as compared with pure sulfides. This is presumably because the stable oxide component protects the sulfide component in the film from the ambient air.

The EL phosphor thin film may be formed of an oxide as well as the aforementioned materials. The oxide offers superior light emitting lifetime and environmental resistance.

The oxide is preferably represented by the compositional formula:

$$A_xB_yO_z:R$$

wherein A is at least one element selected from among Mg, Ca, Sr, Ba and rare earth elements; B is at least one element selected from among Al, Ga and In, and R is an element serving as a luminescence center, and in a preferred embodiment, essentially contains europium.

The subscripts x, y and z denote molar ratios of elements A, B and O, respectively. Preferably, x is from 0 to 5, y is from 0 to 15, and z is from 0 to 30, and more preferably, x is from 1 to 5, y is from 1 to 15, and z is from 3 to 30.

The element R serving as the luminescence center is preferably selected from rare earth elements including Sc, Y, La, Ce, Pr, Nd, Pm, Sm, Eu, Gd, Tb, Dy, Ho, Er, Tm, Yb and Lu. Among these rare earth elements, europium (Eu) is preferable. More preferably, the combination of any two or more of these elements should essentially contain Eu, or Eu is used alone.

Among the phosphor thin films described above, the blue phosphor thin film is preferably formed of barium thioaluminate which may contain oxygen, that is, $Ba_xAl_yO_zS_w:Eu$ wherein x, y, z and w are as defined above for the formula: $A_xB_yO_zS_w:R$.

Those oxides wherein w=0 are also preferred. Of these, most preferred is $Ca_xAl_yO_z:Eu$ wherein x, y and z are as defined above for the formula: $A_xB_yO_z:R$.

Especially preferred for the green phosphor thin film is strontium thiogallate which may contain oxygen, that is, $Sr_xGa_yO_zS_w:Eu$ wherein x, y, z and w are as defined above for the barium thioaluminate.

Those oxides wherein w=0 are also preferred. Of these, most preferred is $Sr_xAl_yO_z:Eu$ wherein x, y and z are as defined above for the formula: $A_xB_yO_z:R$.

While the thickness of the phosphor thin film is not critical, it is appreciated that too large a thickness results in an increased drive voltage whereas too small a thickness leads to a drop of light emission efficiency. Specifically, the phosphor thin film preferably has a thickness of about 100 to 2,000 nm, and especially about 150 to 700 nm, although the thickness varies with the identity of the fluorescent material.

The preferred amount of Eu element added as the luminescence center is 0.1 to 10 at % based on the alkaline earth atoms. In the practice of the invention, Eu element is added alone as the luminescence center, or one or more other element may be added along with Eu. In an embodiment wherein Eu serves as the luminescence center, either Cu or Ce can be added for improving the response and luminance of emission.

For the green and blue primary color phosphor thin films, each preferably has a structure of ZnS thin film/phosphor thin film/ZnS thin film. As long as the phosphor thin film is thin, the sandwiching of the phosphor thin film between ZnS thin films is effective for improving the electric charge injection properties and withstand voltage properties of the phosphor thin film, resulting in an EL device capable of light emission at a high luminance. The ZnS thin film may have a thickness of 30 nm to 400 nm, preferably 100 nm to 300 nm.

Also, the green or blue primary color phosphor thin film may have a structure of alternately deposited ZnS and phosphor thin films with the outermost layer being a ZnS thin film like a structure of ZnS thin film/phosphor thin film/ZnS thin film/phosphor thin film/ZnS thin film, or a multilayer structure of ZnS thin film/phosphor thin film/ZnS thin film/(repeated)/phosphor thin film/ZnS thin film.

For the phosphor thin film assigned to red color, a ZnS:Mn phosphor is used. The ZnS:Mn phosphor may be any well-known one. ZnS is generally present in stoichiometry, with more or less deviations therefrom being acceptable.

While the thickness of the red color phosphor thin film is not critical, it is appreciated that too large a thickness results in an increased drive voltage whereas too small a thickness leads to a drop of light emission efficiency. Specifically, the phosphor thin film preferably has a thickness of about 100 to 2,000 nm, and especially about 150 to 700 nm.

The preferred amount of Mn element added as the luminescence center is 0.3 to 1 at % based on the ZnS. In the practice of the invention, Mn element is added alone as the luminescence center, or one or more other element may be added along with Mn. In an embodiment wherein Mn serves as the luminescence center, either Cu or Ce can be added for improving the response and luminance of emission.

Such a phosphor thin film is preferably prepared, for example, by the following evaporation process.

The ZnS:Mn phosphor for red color may be prepared by a well-known method.

The light emitting portion for red color, that is, a color conversion thin-film layer disposed above the green or blue color phosphor or ZnS:Mn phosphor may be prepared, for example, by spin coating a filter material comprising a resist and a pigment added thereto.

The green or blue primary color phosphor thin film is prepared, for example, by furnishing an alkaline earth sulfide having Eu added thereto and evaporating the source in a vacuum chamber with an electron beam (EB) alone or while simultaneously evaporating thioaluminate, thiogallate or thioindate by resistive heating, thereby forming Eu-doped alkaline earth sulfide, alkaline earth thiogallate, alkaline earth thioaluminate or alkaline earth thioindate. The composition of the material is adjusted by controlling the electric power to the evaporation sources. At this time, H$_2$S gas may be introduced during the evaporation.

Eu added to the source substance may take the form of metal, fluoride, oxide or sulfide. Since the amount of Eu added varies depending on the source substance and the thin film to be deposited, the composition of the source substance is adjusted so as to achieve an appropriate dosage.

During the evaporation, the temperature of the substrate may be room temperature to about 600° C., preferably about 300 to 500° C. If the substrate temperature is too high, the thin film of matrix material may have more asperities on its surface and contain pin holes therein, giving rise to the problem of current leakage on EL devices. Also the thin film can be colored brown. For this reason, the aforementioned temperature range is preferable. The film deposition is preferably followed by annealing. The preferred annealing temperature is about 600 to 1,000° C., and more preferably about 600 to 800° C.

The phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, $N_2$, Ar, air, sulfur vapor or $H_2S$ after its formation.

While the thickness of the light emitting layer is not critical, it is appreciated that too large a thickness results in an increased drive voltage whereas too small a thickness leads to a drop of light emission efficiency. Specifically, the layer preferably has a thickness of about 100 to 2,000 nm, and especially about 150 to 700 nm although it varies with the type of fluorescent material.

The pressure during evaporation is preferably $1.33 \times 10^{-4}$ to $1.33 \times 10^{-1}$ Pa ($1 \times 10^{-6}$ to $1 \times 10^{-3}$ Torr). When a gas such as $H_2S$ is introduced, the pressure may be adjusted to $6.65 \times 10^{-3}$ to $6.65 \times 10^{-2}$ Pa ($5 \times 10^{-5}$ to $5 \times 10^{-4}$ Torr). If the pressure exceeds the range, the operation of the electron gun becomes unstable, and composition control becomes very difficult. The rate of gas feed is preferably 5 to 200 standard cubic centimeters per minute (SCCM), especially 10 to 30 SCCM although it varies depending on the capacity of the vacuum system.

If desired, the substrate may be moved or rotated during evaporation. By moving or rotating the substrate, the deposited film becomes uniform in composition and minimized in the variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may arise a problem of seal upon admission into the vacuum chamber. If the rotational speed of the substrate is too low, compositional gradation may occur in the thickness direction within the chamber so that the resulting light emitting layer may have poor characteristics. The means for rotating the substrate may be any well-known rotating mechanism including a power source such as a motor or hydraulic rotational mechanism and a power transmission/gear mechanism having a combination of gears, belts, pulleys and the like.

The means for heating the evaporation sources and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about +1° C., preferably about 0.5° C. at 1,000° C.

Figure 2:
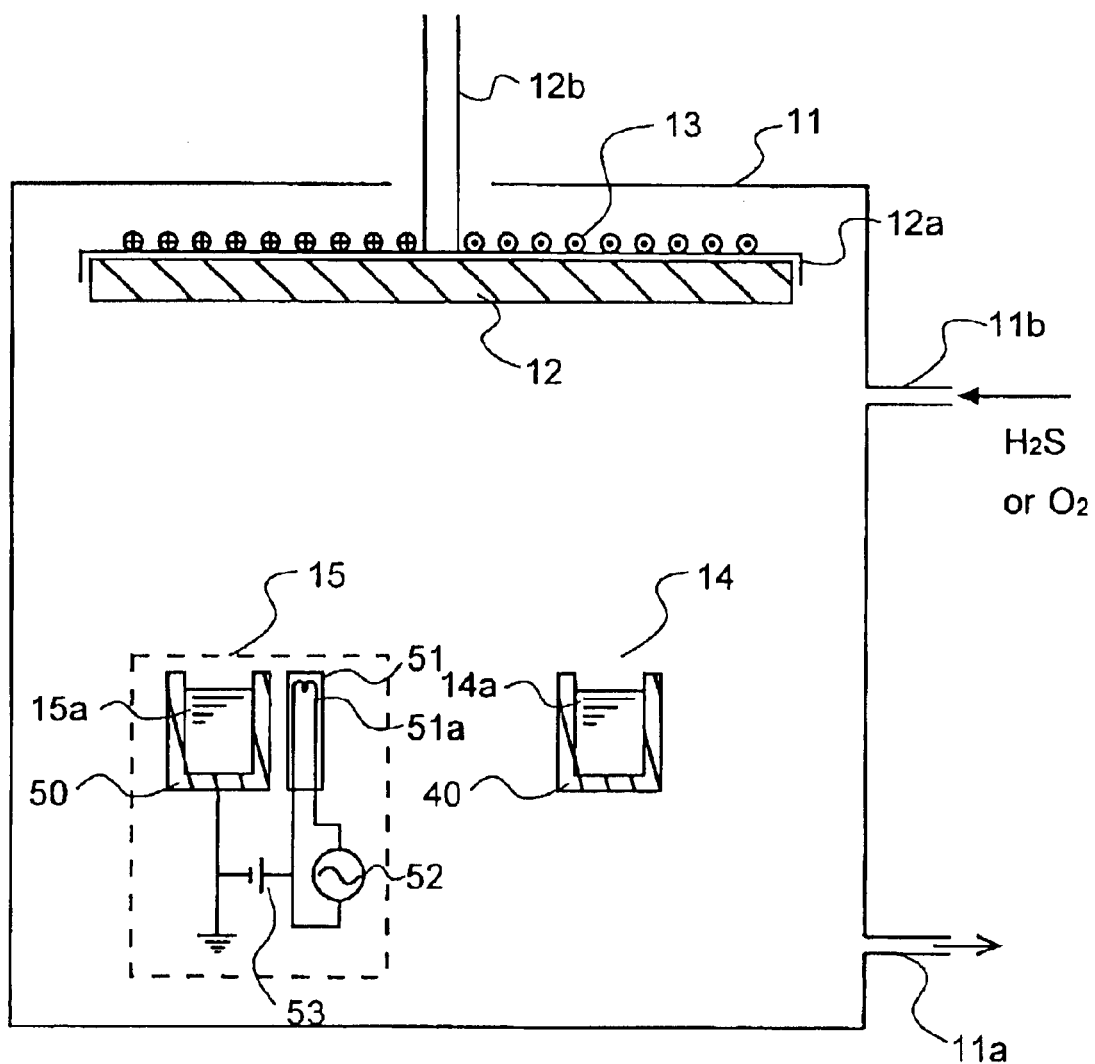
FIG. 2 is a schematic cross-sectional view showing an exemplary construction of an apparatus for depositing a phosphor thin film according to the invention.
Figure 3:
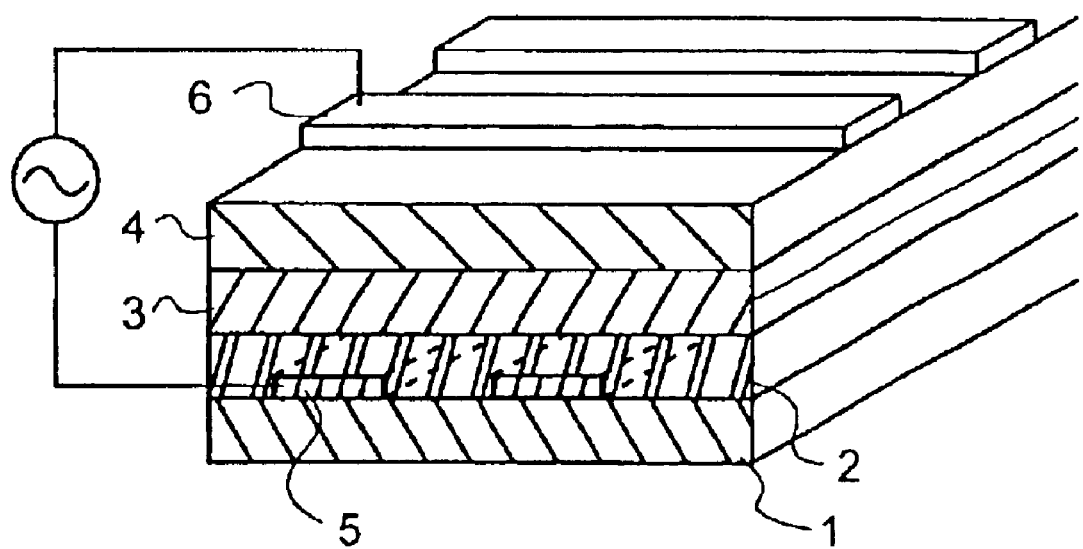
FIG. 3 is a partial cross-sectional view showing an exemplary construction of a prior art inorganic EL device.

FIG. 2 illustrates one exemplary construction of the apparatus for forming the light emitting layer according to the invention. Reference is made to an embodiment wherein Eu-doped alkaline earth sulfide, alkaline earth thiogallate, alkaline earth thioaluminate or alkaline earth thioindate is produced by using Eu-added alkaline earth sulfide and any one of thiogallate, thioaluminate and thioindate as the evaporation sources and admitting $H_2S$ during evaporation. In the illustrated embodiment, a substrate 12 on which the light emitting layer is to be deposited, a resistive heating evaporation source in the form of a Knudsen cell 14 and an EB evaporation source 15 are disposed within a vacuum chamber 11.

In the resistive heating evaporation source or K cell 14 serving as means for evaporating thioaluminate, thiogallate or thioindate, any one reactant 14a is contained. The K cell 14 is heated by a heater (not shown) so that the reactant may evaporate at a desired evaporation rate.

The electron beam (EB) evaporation source 15 serving as means for evaporating the alkaline earth sulfide include a crucible 50 which contains an alkaline earth sulfide 15a with a luminescence center added and an electron gun 51 having an electron emitting filament 51a built therein. Built in the electron gun 51 is a mechanism for controlling an electron beam. To the electron gun 51 are connected an AC power supply 52 and a bias power supply 53. The electron gun 51 produces an electron beam at a predetermined power in a controlled manner, for evaporating the alkaline earth sulfide 15a at a predetermined rate. Although the evaporation sources are controlled by the K cell and electron gun in the illustrated embodiment, multi-source co-evaporation using a single electron gun is also possible. The evaporation process of the latter is known as multi-source pulse evaporation process.

In the illustrated embodiment, the evaporation sources 14 and 15 are depicted, for the convenience of illustration, at positions corresponding to discrete local areas of the substrate. Actually, the evaporation sources are located such that the deposited film may become uniform in composition and thickness.

The vacuum chamber 11 has an exhaust port 11a through which the chamber is evacuated to establish a predetermined vacuum in the chamber. The vacuum chamber 11 also has an inlet port 11b through which a reactant gas such as hydrogen sulfide is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire is closely secured to the substrate holder 12a so that the substrate may be heated and maintained at the desired temperature.

Using the illustrated apparatus, the vapor of thioaluminate, thiogallate or thioindate and the vapor of alkaline earth sulfide are evaporated from the K cell 14 and EB evaporation source 15 and deposited on the substrate 12 where they are bound together to form a fluorescent layer of Eu-doped alkaline earth sulfide, alkaline earth thiogallate, alkaline earth thioaluminate or alkaline earth thioindate. By rotating the substrate 12 during the evaporation process if desired, the light emitting layer being deposited can be made more uniform in composition and thickness distribution.

Using the phosphor thin film described above as a light emitting layer 3, an inorganic EL device is manufactured, for example, to the structure shown in FIG. 1.

FIG. 1 is a partial cross-sectional view showing an exemplary construction of the inorganic EL device using the light emitting layer of the invention. In FIG. 1, a predetermined pattern of lower electrodes 5 is formed on a substrate 1, and a first thick insulating layer (or thick-film dielectric layer) 2a is formed on the lower electrodes 5 and optionally, a dielectric layer 2b formed by a solution coating/firing method such as sol-gel method or MOD is provided for the purpose of flattening or guaranteeing insulation. On the first insulating layer 2a and dielectric layer 2b, a light-emitting layer 3 including R, G and B regions 3r, 3g and 3b, and a second insulating layer (or thin-film dielectric layer) 4 are successively formed. On the second insulating layer 4, a predetermined pattern of upper electrodes 6 is formed so as to construct a matrix circuit with the lower electrodes 5. The red, green or blue phosphor thin film 3r, 3g or 3b is selectively coated at the intersections of matrix electrodes.

On the upper electrodes 6 corresponding to the red color phosphor layer 3r, a color conversion layer 7 is formed. The red color phosphor layer as used herein refers to a green or blue color phosphor layer for providing a red color through the above-mentioned conversion mechanism or a phosphor layer for emitting a red or orange color.

An AC power supply 10 is connected to the lower and upper electrodes 5 and 6. By operating a drive circuit (not shown) so as to select any lines of lower and upper electrodes and selectively apply a voltage across the light emitting layer 3, light emission from the selected pixel is obtainable.

Between two adjacent ones of the substrate 1, electrodes 5, 6, thick-film insulating layer 2 and thin-film insulating layer 4, an intermediate layer such as a bond enhancing layer, stress relief layer or reaction preventing barrier layer may be disposed. The thick film may be improved in smoothness as by polishing its surface or using a smoothing layer.

Preferably, a $BaTiO_3$ thin-film layer is formed as the barrier layer between the thick-film insulating layer and the thin-film insulating layer.

Any desired material may used as the substrate as long as the substrate has a heat resistant temperature or melting point of at least 600° C., preferably at least 700° C., especially at least 800° C. so that the substrate may withstand the thick-film forming temperature, the forming temperature of the EL fluorescent layer and the annealing temperature of the EL device, the substrate allows deposition thereon of functional thin films such as a light emitting layer by which the EL device can be constructed, and the substrate maintains the predetermined strength. Illustrative examples include glass substrates, ceramic substrates of alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride (SiN), and silicon carbide (SiC+BeO) as well as heat resistant glass substrates of crystallized glass or the like. Of these, alumina substrates and crystallized glass substrates are especially preferable. Where heat transfer is necessary, beryllia, aluminum nitride, silicon carbide and the like are preferred.

Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred.

Any well-known thick-film dielectric material may be used as the thick-film dielectric material (first insulating layer). Materials having a relatively high permittivity are preferred.

For example, lead titanate, lead niobate and barium titanate based materials can be used.

The dielectric thick film has a resistivity of at least $10^8$ $\Omega\cdot cm$, especially about $10^{10}$ to $10^{18}$ $\Omega\cdot cm$. A material having a relatively high permittivity as well is preferred. The permittivity $\epsilon$ is preferably about 100 to 10,000. The preferred thickness is 5 to 50 $\mu m$, especially 10 to 30 $\mu m$.

The insulating layer thick film is formed by any desired method. Methods capable of relatively easily forming films of 10 to 50 $\mu m$ thick are useful, and the sol-gel method and printing/firing method are especially preferred.

Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (second insulating layer) is made include silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials, and multilayer or mixed thin films of any. In forming the insulating layer from these materials, any of conventional methods such as evaporation, sputtering, CVD, sol-gel and printing/firing methods may be used. The insulating layer preferably has a thickness of about 50 to 1,000 nm, especially about 100 to 500 nm.

The electrode (lower electrode) is formed at least on the substrate side or within the first dielectric layer. As the electrode layer which is exposed to high temperature during formation of a thick film and during heat treatment along with the light emitting layer, use may be made of a customary metal electrode containing as a main component one or more elements selected from palladium, rhodium, iridium, rhenium, ruthenium, platinum, tantalum, nickel, chromium and titanium.

Another electrode layer serving as the upper electrode is preferably a transparent electrode which is transmissive to light in the predetermined emission wavelength region because the emitted light often exits from the opposite side to the substrate. When the substrate and insulating layer are transparent, a transparent electrode may also be used as the lower electrode because this permits the emitted light to exit from the substrate side. Use of transparent electrodes of ZnO, ITO or the like is especially preferred. ITO generally contains $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode layer may be either polycrystalline silicon (p-Si) or amorphous silicon (a-Si), or even single crystal silicon if desired.

In addition to silicon as the main component, the electrode is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode layer should preferably have a resistivity of up to 1 $\Omega\cdot cm$, especially about 0.003 to 0.1 $\Omega\cdot cm$ in order to apply an effective electric field across the light emitting layer. The preferred thickness of the electrode layer is about 50 to 2,000 nm, especially about 100 to 1,000 nm although it depends on the electrode material.

The EL panel of the invention has been described while it can be applied to other forms of display device, typically full-color panels, multicolor panels and partial color panels partially displaying three colors.

EXAMPLE

Examples are given below for illustrating the invention in more detail.

Example A-1

An EL panel of the invention was fabricated using a red light emitting portion having a green phosphor thin film combined with a color conversion film. For the substrate and thick-film insulating layer, $BaTiO_3$ base dielectric material having a permittivity of 5,000 was commonly used. For the lower electrode, a Pd electrode was used. On fabrication, a sheet of the substrate was formed, and the lower electrode and thick-film insulating layer were screen printed thereon to form a green sheet, which was co-fired. The surface was polished, obtaining the substrate bearing a thick-film first insulating layer of 30 μm thick. On this substrate, a $BaTiO_3$ coating was formed by sputtering as a buffer layer to 400 nm. This was annealed in air at 700° C., obtaining a composite substrate.

On the composite substrate, each of two phosphor thin films for green and blue primary colors was formed as a structure of $Al_2O_3$ film (50 nm)/ZnS film (200 nm)/phosphor thin film (or light emitting layer, 300 nm)/ZnS film (200 nm)/$Al_2O_3$ film (50 nm), in order for the resulting EL device to produce stable light emission.

To form the phosphor thin film for each color in the predetermined areas, a process of patterning and etching a photoresist is utilized in the order of the blue primary color, green primary color and phosphor thin films whereby the thin films were patterned and formed as partial lines.

Among the three phosphor thin films for red, green and blue colors, a phosphor thin film of green $SrGa_2S_4$ system combined with a color conversion thin-film layer was used as the red, a phosphor thin film of $SrGa_2S_4$ system used as the green, and a phosphor thin film of $BaAl_2S_4$ system used as the blue. Eu was used as the luminescence center for both the green and blue colors.

In preparation of the blue phosphor thin film, a thin film was prepared by the following procedure. For film formation, an apparatus including one E-gun and one resistive heating evaporation source or cell as shown in FIG. 2 was used.

An EB source 15 containing a BaS powder having 5 mol % Eu added and a resistive heating evaporation source 14 containing a $Al_2S_3$ powder were placed in a vacuum chamber 11 into which $H_2S$ gas was admitted. The reactants were simultaneously evaporated from the respective sources and deposited on a rotating substrate heated at 400° C., forming a thin film. The evaporation rates of the sources were adjusted such that the film was deposited on the substrate at a deposition rate of 1 nm/sec. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes. It was then patterned into lines.

Separately, a phosphor thin film was similarly formed on a Si substrate. The resulting phosphor thin film in the form of a $Ba_xAl_yO_zS_w$:Eu thin film was analyzed for composition by XRF, finding an atomic ratio of Ba:Al:O:S:Eu= 8.91:18.93:9.33:28.05:0.35.

In preparation of the green phosphor thin film, a thin film was prepared by the following procedure. For film formation, an apparatus including one E-gun and one resistive heating evaporation source or cell as shown in FIG. 2 was used.

An EB source 15 containing a SrS powder having 5 mol % Eu added and a resistive heating evaporation source 14 containing a $Ga_2S_3$ powder were placed in a vacuum chamber 11 into which $H_2S$ gas was admitted. The reactants were simultaneously evaporated from the respective sources and deposited on a rotating substrate heated at 400° C., forming a thin film. The evaporation rates of the sources were adjusted such that the film was deposited on the substrate at a deposition rate of 1 nm/sec. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes. It was then patterned into lines.

Separately, a phosphor thin film was similarly formed on a Si substrate. The resulting phosphor thin film in the form of a $Sr_xGa_yO_zS_w$:Eu thin film was analyzed for composition by XRF, finding an atomic ratio of Sr:Ga:O:S:Eu= 6.02:19.00:11.63:48.99:0.34.

The thin film was obtained as the structure of $Al_2O3$ film (50 nm)/ZnS film (200 nm)/phosphor thin film (300 nm)/ZnS film (200 nm)/$Al_2O_3$ film (50 nm). The structure was annealed in air at 750° C. for 10 minutes. It was then patterned into lines.

By RF magnetron sputtering technique using an ITO oxide target, a transparent ITO electrode of 200 nm thick was formed on the resulting structure at a substrate temperature of 250° C. The ITO electrode was then patterned into a matrix pattern, and a color conversion layer to red was patterned as shown in FIG. 1 to complete an EL device.

For the color conversion layer, a fluorescent pigment, SINLOIHI Color FA45J by SINLOIHI Co., Ltd. and a fluorescent dye, Rhodamine B by Eastman Kodak Co. were used. The resist used was negative working acrylic photoresist CT by Fuji Hunt Electronics Technology Co., Ltd. The photoresist was dissolved in an organic solvent (ethanol) together with the fluorescent dye, and the pigment added, followed by agitation for dispersion.

The resulting coating was patterned, yielding a color conversion thin-film layer of 3 μm thick.

In the EL device thus fabricated, an electric field having a frequency of 240 Hz, a pulse width of 50 μS and seven different voltages was applied between two electrodes of each matrix to produce light of each color with 8 bit gradations. The EL panel could emit light of 512 colors at an average luminance of 20 cd/m² in good response.

Example A-2

A color conversion thin-film layer was formed as in Example A-1 except that SINLOIHI Color FZ5005 was used instead of SINLOIHI Color FA45J. Substantially equivalent results were obtained.

Example A-3

A color conversion thin-film layer was formed as in Example A-1 except that Rhodamine 6G was used instead of Rhodamine B. Substantially equivalent results were obtained.

Example B-1

An EL panel of the invention was fabricated using a ZnS:Mn phosphor thin film for red color. For the substrate and thick-film insulating layer, $BaTiO_3$ base dielectric material having a permittivity of 5,000 was commonly used. For the lower electrode, a Pd electrode was used. On fabrication, a sheet of the substrate was formed, and the lower electrode and thick-film insulating layer were screen printed thereon to form a green sheet, which was co-fired. The surface was polished, obtaining the substrate bearing a thick-film first insulating layer of 30 μm thick. On this substrate, a $BaTiO_3$ coating was formed by sputtering as a buffer layer to 400 nm. This was annealed in air at 700° C., obtaining a composite substrate.

On the composite substrate, each of two phosphor thin films for green and blue primary colors was formed as a structure of $Al_2O_3$ film (50 nm)/ZnS film (200 nm)/phosphor thin film (or light emitting layer, 300 nm)/ZnS film (200 nm)/$Al_2O_3$ film (50 nm), in order for the resulting EL device to produce stable light emission.

The ZnS:Mn phosphor thin film for red color was formed as a structure of $Al_2O_3$ film (50 nm)/ZnS:Mn film (or light emitting layer, 700 nm)/$Al_2O_3$ film (50 nm).

To form the phosphor thin film for each color in the predetermined areas, a process of patterning and etching a photoresist is utilized in the order of the blue primary color, green primary color and ZnS:Mn phosphor thin films whereby the thin films were patterned and formed as partial lines.

Among the three phosphor thin films for red, green and blue colors, a phosphor thin film of ZnS:Mn was used as the red, a phosphor thin film of $SrGa_2S_4$ system used as the green, and a phosphor thin film of $BaAl_2S_4$ system used as the blue. Eu was used as the luminescence center for both the green and blue colors.

In preparation of the blue phosphor thin film, a thin film was prepared by the following procedure. For film formation, an apparatus including one E-gun and one resistive heating evaporation source or cell as shown in FIG. 2 was used.

An EB source 15 containing a BaS powder having 5 mol % Eu added and a resistive heating evaporation source 14 containing a $Al_2S_3$ powder were placed in a vacuum chamber 11 into which $H_2S$ gas was admitted. The reactants were simultaneously evaporated from the respective sources and deposited on a rotating substrate heated at 400° C., forming a thin film. The evaporation rates of the sources were adjusted such that the film was deposited on the substrate at a deposition rate of 1 nm/sec. The $H_2S$ gas was fed at 20 SCCM. In this way, a blue phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes.

It was then patterned into lines.

Separately, a phosphor thin film was similarly formed on a Si substrate. The resulting phosphor thin film in the form of a $Ba_xAl_yO_zS_w$:Eu thin film was analyzed for composition by XRF, finding an atomic ratio of Ba:Al:O:S:Eu= 8.91:18.93:9.33:28.05:0.35.

In preparation of the green phosphor thin film, a thin film was prepared by the following procedure. For film formation, an apparatus including one E-gun and one resistive heating evaporation source or cell as shown in FIG. 2 was used.

An EB source 15 containing a SrS powder having 5 mol % Eu added and a resistive heating evaporation source 14 containing a $Ga_2S_3$ powder were placed in a vacuum chamber 11 into which $H_2S$ gas was admitted. The reactants were simultaneously evaporated from the respective sources and deposited on a rotating substrate heated at 400° C., forming a thin film. The evaporation rates of the sources were adjusted such that the film was deposited on the substrate at a deposition rate of 1 nm/sec. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes.

It was then patterned into lines, obtaining a pattern for green color.

Separately, a phosphor thin film was similarly formed on a Si substrate. The resulting phosphor thin film in the form of a $Sr_xGa_yO_zS_w$:Eu thin film was analyzed for composition by XRF, finding an atomic ratio of Sr:Ga:O:S:Eu= 6.02:19.00:11.63:48.99:0.34.

In preparation of the red phosphor thin film, a thin film was prepared by the following procedure. For film formation, an apparatus as shown in FIG. 2 was used. Only one E-gun was used herein.

An EB source 15 containing a ZnS pellet having 0.4 mol % Mn added was placed in a vacuum chamber 11. The reactant was evaporated from the source and deposited on a rotating substrate heated at 200° C., forming a thin film. The evaporation rate of the source was adjusted such that the film was deposited on the substrate at a deposition rate of 1 nm/sec. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes.

As was the green layer, the red layer was then patterned into lines.

By RF magnetron sputtering technique using an ITO oxide target, a transparent ITO electrode of 200 nm thick was formed on the resulting structure at a substrate temperature of 250° C. The ITO electrode was then patterned into a matrix pattern. Further, a resist having a red pigment dispersed therein was formed and patterned to form a color conversion thin-film layer as shown in FIG. 1, to complete an EL device.

In the EL device thus fabricated, an electric field having a frequency of 240 Hz, a pulse width of 50 μS and seven different voltages was applied between two electrodes of each matrix to produce light of each color with 8 bit gradations. The EL panel could emit light of 512 colors at an average luminance of 30 cd/m² in good response.

Example B-2

Example B-1 was repeated except that instead of the resist having a red pigment dispersed therein, a ZnSe film of 500 nm thick was formed as the color conversion thin-film layer. Substantially equivalent results were obtained.

Example B-3

Example B-1 was repeated except that instead of the resist having a red pigment dispersed therein, a color conversion thin-film layer was formed using Sulforodamine 101 by Eastman Kodak Co. as the fluorescent dye and negative working acrylic photoresist CT by Fuji Hunt Electronics Technology Co., Ltd. as the resist. The fluorescent dye was dissolved in an organic solvent (ethanol), which was mixed with and dispersed in the resist; and a coating was formed and patterned to complete a color conversion thin-film layer of 3 μm thick. Substantially equivalent results were obtained.

Without a need for a filter substrate, the EL panel of the invention can produce light emissions of green and blue primary colors with an improved color purity and a high luminance and also produce light emission of red color through a simple construction. The color EL panel develops different colors at luminances with minimal variations. The yield of panel manufacture is increased and the cost is reduced. The present invention is of great worth.

After the EL device structure is formed, a color conversion thin-film layer can be formed and patterned directly on its output surface. This eliminates a need for filter alignment and facilitates the manufacturing process and increases the working efficiency.

According to the invention, an EL panel, especially a full color EL panel is provided, comprising phosphor thin films for producing light of an improved color purity without a need for a RGB patterned filter substrate.

What is claimed is:

1. An EL panel for providing a display of three colors, comprising at least EL phosphor thin films of two types for emitting green and blue colors, and a red light emitting portion, said EL phosphor thin films of two types for emitting green and blue colors comprising an alkaline earth sulfide or oxide, and wherein only said red light emitting portion has a color conversion layer, or wherein said red light emitting portion is constructed by combining the EL phosphor thin film for emitting green or blue color with a color conversion layer.

2. The EL panel of claim 1 wherein only said red light emitting portion has a color conversion layer.

3. The EL panel of claim 2 wherein said red light emitting portion includes a phosphor thin film for emitting electroluminescent light from an output surface and the color conversion layer disposed on the output surface.

4. The EL panel of claim 1 wherein said red light emitting portion is constructed by combining the EL phosphor thin film for emitting green or blue color with a color conversion layer.

5. The EL panel of claim 1 wherein said red light emitting portion includes an EL phosphor thin film comprising primarily ZnS:Mn.

6. The EL panel of claim 1 wherein the EL phosphor thin film for emitting green color comprises as a matrix material an alkaline earth thiogallate optionally comprising oxygen, and the EL phosphor thin film for emitting blue color comprises as a matrix material an alkaline earth thioaluminate optionally comprising oxygen.

7. The EL panel of claim 6 wherein the EL phosphor thin film for emitting blue color comprises as a matrix material barium thioaluminate.

8. The EL panel of claim 6 wherein the EL phosphor thin film for emitting green color comprises as a matrix material strontium thiogallate.

9. The EL panel of claim 6 wherein both the phosphor thin films contain Eu as a luminescence center.

10. The EL panel of claim 1 wherein in the CIE color purity coordinates (x, y), the green color emitted has coordinates of x<0.3 and y>0.6 and the blue color emitted has coordinates of x<0.2 and y<0.2.

11. The EL panel of claim 1 wherein the EL phosphor thin films of two types are represented by the compositional formula:

$$A_xB_yO_zS_w:R$$

wherein A is at least one element selected from the group consisting of Mg, Ca, Sr, Ba and rare earth elements, B is at least one element selected from the group consisting of Al, Ga and In, x is a number from 0 to 5, y is a number from 0 to 15, z is a number from 0 to 30, w is a number from 0 to 30, and R is an element serving as a luminescence center.

12. The EL panel of claim 1 wherein each of the EL phosphor thin films of two types for emitting green and blue colors comprises an oxysulfide which contains oxygen and sulfur elements such that the molar ratio of O/(S+O) is in the range from 0.01 to 0.85.

* * * * *